(12) United States Patent
Ishikawa

(10) Patent No.: US 8,794,413 B2
(45) Date of Patent: Aug. 5, 2014

(54) DRIVING DEVICE AND IMAGE FORMING APPARATUS

(71) Applicant: Canon Kabushiki Kaisha, Tokyo (JP)

(72) Inventor: Rin Ishikawa, Ushiku (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/932,095

(22) Filed: Jul. 1, 2013

(65) Prior Publication Data

US 2014/0008171 A1    Jan. 9, 2014

(30) Foreign Application Priority Data

Jul. 6, 2012    (JP) ................................. 2012-153055

(51) Int. Cl.
*F16D 13/22*    (2006.01)

(52) U.S. Cl.
USPC ....................................................... 192/69.9

(58) Field of Classification Search
USPC ......... 192/69.9, 69.91, 69, 66.1, 70.16, 70.19
See application file for complete search history.

(56) References Cited

U.S. PATENT DOCUMENTS

| 5,520,272 | A  | * | 5/1996  | Ewer et al. ..................... | 192/36    |
| 6,082,514 | A  | * | 7/2000  | Averill ......................... | 192/69.42 |
| 7,143,883 | B2 | * | 12/2006 | McCalla et al. ............. | 192/69.41 |
| 7,815,542 | B2 | * | 10/2010 | Dec ............................... | 475/326   |

FOREIGN PATENT DOCUMENTS

| JP | 2003-208024 A | 7/2003 |
| JP | 2007-239964 A | 9/2007 |

* cited by examiner

*Primary Examiner* — David D Le
*Assistant Examiner* — David J Hlavka
(74) *Attorney, Agent, or Firm* — Canon USA Inc. IP Division

(57) ABSTRACT

A clutch mechanism used in a system in which first and second driven members are driven using one driving source. The mechanism includes a driving member, a driving side engaging member, an idler side engaging member, an urging unit, a releasing member provided with a cam surface configured to cause the driving side engaging member to move axially, and to perform engagement or release of the driving side engaging member with or from the idler side engaging member, and a cam member provided with a cam surface configured to engage with the cam surface of the releasing member. In at least one of the releasing member and the cam member, at least a portion where collision occurs when the releasing member has moved in an axial direction to approach the cam member, is formed of an elastic member.

7 Claims, 17 Drawing Sheets

DRIVING DEVICE AND IMAGE FORMING APPARATUS

BACKGROUND OF THE INVENTION

1. Field of the Invention

The present invention relates to a driving device used for a copying machine or a printer, and an image forming apparatus equipped with the driving device.

2. Description of the Related Art

Conventionally, in order to solve problems with consumption or deterioration of developer in an inline type color image forming apparatus using, for example, the electrophotographic process, a method for separately controlling rotations of an electrophotographic photosensitive member (photosensitive member) and a development device to minimize rotation of the development device is considered.

Further, in order to achieve low cost and reduction in size, a method for driving the photosensitive member and the development device using one motor, and providing a clutch that controls a state of rotation or stop of a driving system of the development device is devised.

An electromagnetic clutch or a spring clutch is often used in the driving system of the development device of the conventional image forming apparatus. However, this configuration has problems of a relatively high cost, a limited shape, and possible occurrence of operation failure caused by slip.

On the other hand, Japanese Patent Application Laid-Open No. 2003-208024 (Patent Document 1) discusses a mechanical clutch provided on a driving system of a development device. The mechanical clutch, by rotation of a lever member provided with a cam surface, causes a releasing member provided with a cam surface that engages with the cam surface of the lever member, and a driving side engaging component moved by the releasing member, to axially move. Accordingly, the mechanical clutch performs coupling and releasing of a drive between the driving side engaging component and an idler side engaging component. The driving side engaging components urged by a coil spring in a direction in which the driving side engaging component meshes with the idler side engaging component. The releasing member, when moved axially by the lever member, moves the driving side engaging component in a direction in which it releases the driving side engaging component from the idler side engaging component against a force of the coil spring.

In order to further reduce consumption and deterioration of the developer, a quick switching between coupling and releasing is required for the above-described mechanical clutch. Therefore, it is required to make a slope of the above-described cam surface as steep as possible.

However, the above-described mechanical clutch has the following issues to be improved.

That is, in the above-described mechanical clutch, a state where apexes of respective cams of the releasing member and the lever member are in contact with each other is a state where coupling of a drive is released. Then, when changing the state to a coupling state of the drive by rotating the lever member from this state, the releasing member moves axially along the cam surface by an urging force of the coil spring. Therefore, in a case where the cam surface has a steep angle, for example, for a quick coupling, there is a possibility that a collision between the releasing member and the lever member occurs. Accordingly, rotation of the photosensitive member which is the most important in terms of an image formation becomes unstable. As a result, d streaks may be produced on images at a timing of collision of the cams.

Therefore, the mechanical clutch as described above may be unsuitable in some cases for the configuration for simultaneously driving the photosensitive member and the development device using one motor. As a result, conventionally, in the configuration for driving the photosensitive member and the development device using one motor, there is not a mechanical clutch superior in cost or image stability, which enables on-and-off of the drive to the development device without affecting stability of rotation of the photosensitive member even in the middle of rotating the photosensitive member.

SUMMARY OF THE INVENTION

The present invention is directed to a driving device and an image forming apparatus provided with a clutch mechanism capable of reducing an influence to a drive of a first driven member by shock at the time of coupling or releasing of a clutch, in a configuration for driving a first member and a second driven member using one driving source, and providing a clutch in a driving system of the second driven member.

According to an aspect of the present invention, a clutch mechanism used in a system in which a driving source rotationally drives a first driven member and a second driven member, and configured to couple or release a drive to the second driven member includes a driving member configured to transmit a drive from the driving source to a rotating shaft on an idler side, a driving side engaging member configured to rotate in synchronization with the driving member, and to be movable in an axial direction, an idler side engaging member fixed to a rotating shaft on an idler side, and configured to engage with the driving side engaging member, an urging unit configured to urge the driving side engaging member in a direction in which the driving side engaging member meshes with the idler side engaging member, a releasing member provided with a cam surface configured to cause the driving side engaging member to move axially, and to perform engagement or release of the driving side engaging member with or from the idler side engaging member, and a cam member provided with a cam surface configured to engage with the cam surface of the releasing member, wherein in at least one of the releasing member and the cam member, at least a portion where collision occurs when the releasing member has moved in the axial direction to approach the cam member, is formed of an elastic member.

According to another aspect of the present invention, a clutch mechanism used in a system in which a driving source rotationally drives a first driven member and a second driven member, and configured to couple or release a drive to the second driven member includes a driving member configured to transmit a drive from the driving source to a rotating shaft on an idler side, a driving side engaging member configured to rotate in synchronization with the driving member, and to be movable in an axial direction, an idler side engaging member fixed to a rotating shaft on an idler side, and configured to engage with the driving side engaging member, an urging unit configured to urge the driving side engaging member in a direction to mesh with the idler side engaging member, a releasing member provided with a cam surface configured to cause the driving side engaging member to move axially, and to perform engagement or release of the driving side engaging member with or from the idler side engaging member, and a cam member provided with a cam surface configured to engage with the cam surface of the releasing member, wherein in at least one of the releasing member and the cam member, at least a portion where collision occurs when the releasing member has moved in an axis direction to approach the cam member, is provided with a protruding portion which protrudes in an orthogonal direction to the axis direction, and the protruding portion is elastically deformable in the axial direction.

According to yet another aspect of the present invention, a clutch mechanism used in a system in which a driving source rotationally drives a first driven member and a second driven member, and configured to couple or release a drive to the second driven member includes a driving member configured to transmit a drive from the driving source to a rotating shaft on an idler side, a driving side engaging member configured to rotate in synchronization with the driving member, and to be movable in an axial direction, an idler side engaging member fixed to a rotating shaft on an idler side, and configured to engage with the driving side engaging member, a first urging unit configured to urge the driving side engaging member in an urging direction to mesh with the idler side engaging member, a releasing member provided with a cam surface, and configured to cause the driving side engaging member to move in the axial direction, and to perform engagement or release of the driving side engaging member with or from the idler side engaging member, a cam member provided with a cam surface configured to engage with the cam surface of the releasing member, and a second urging unit provided between the releasing member and the cam member, and configured to urge the releasing member in an opposite direction to the urging direction of the first urging unit, and to have an urging force smaller than an urging force of the first urging unit.

Further features of the present invention will become apparent from the following description of exemplary embodiments with reference to the attached drawings.

DESCRIPTION OF THE EMBODIMENTS

Hereinbelow, a driving device and an image forming apparatus according to an exemplary embodiment of the present invention will be described in greater detail with reference to the drawings.

1. Entire Configuration of Image Forming Apparatus

Figure 1:
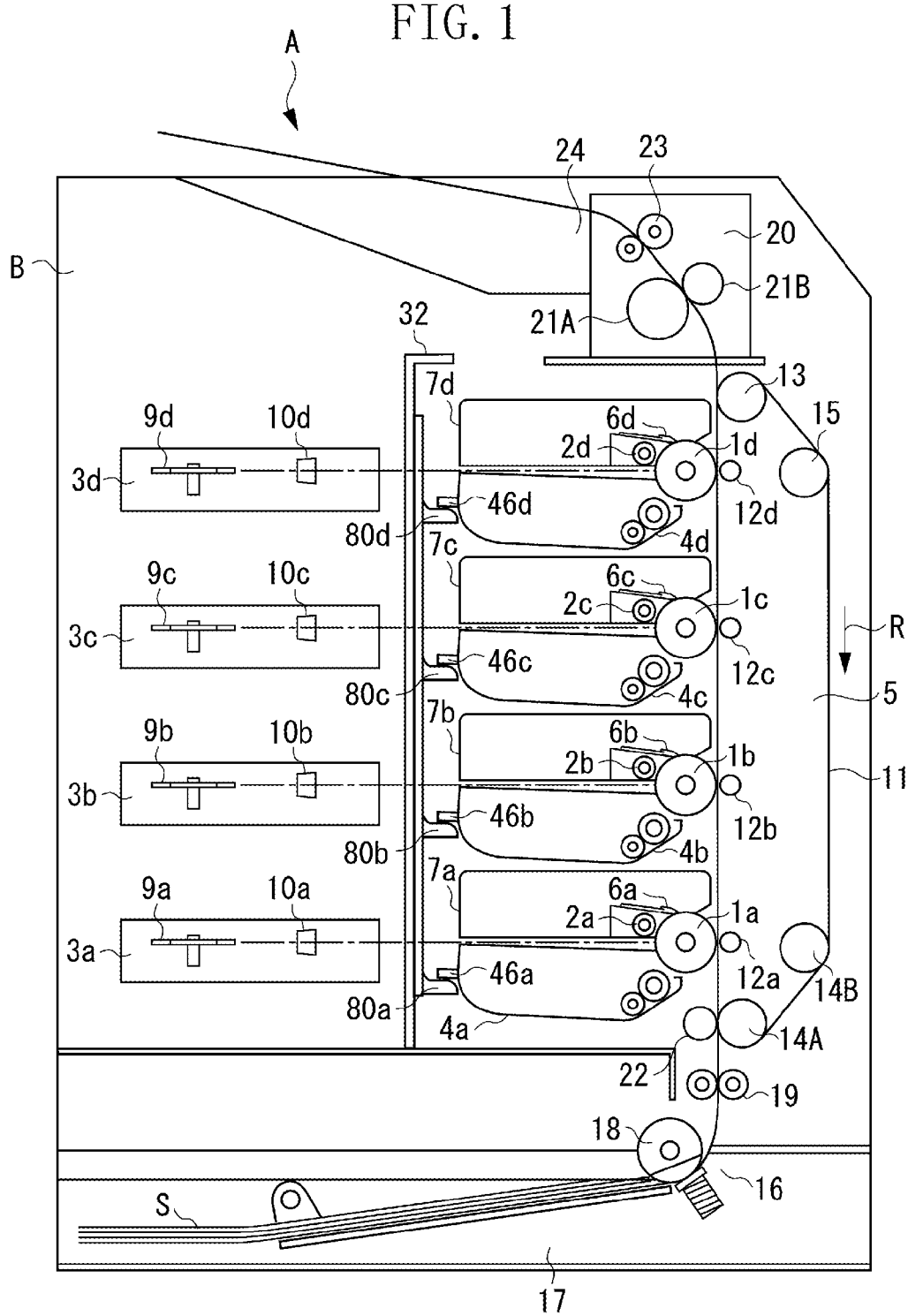
FIG. 1 is a cross-sectional view of an image forming apparatus according to an exemplary embodiment of the present invention.
Figure 2:
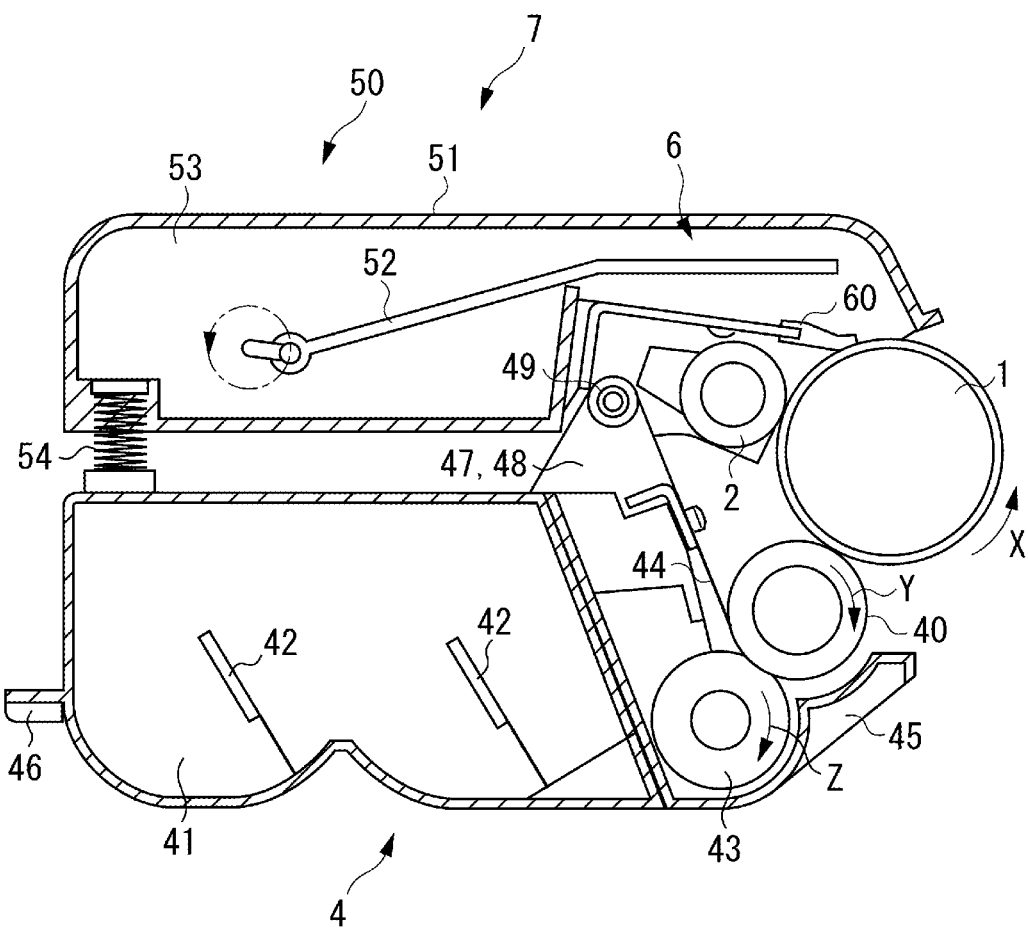
FIG. 2 is a cross-sectional view of a process cartridge attachable to and detachable from an image forming apparatus according to an exemplary embodiment of the present invention.

First, the entire configuration of an image forming apparatus according to an exemplary embodiment of the present invention will be described. FIG. 1 is a vertical cross-sectional view illustrating the entire configuration of an image forming apparatus A according to the present exemplary embodiment serving as a full-color laser beam printer. FIG. 2 is a principal cross-sectional view of a process cartridge 7 included in the image forming apparatus A.

The image forming apparatus A according to the present exemplary embodiment has a first, a second, a third, and a fourth image forming units Pa, Pb, Pc, and Pd each for forming images of yellow (Y), magenta (M), cyan (C), and black (K), as a plurality of image forming units. In the present exemplary embodiment, configurations and operations of the first, the second, the third, and the fourth image forming units Pa, Pb, Pc, and Pd are mostly similar to each other. Therefore, hereinbelow, in a case where descriptions are made without especially distinguishing among respective colors, descriptions may be made by omitting suffixes a, b, c, and d of reference numerals each representing an element provided for either color.

As illustrated in FIG. 1, the color image forming apparatus A is provided with photosensitive drums 1a, 1b, 1c, and 1d as four rotatable image bearing members provided in a row arrangement in a vertical direction. The photosensitive drum 1 is rotationally driven in an arrow X direction (counterclockwise) in FIG. 2 by a driving device (FIG. 10) as a driving unit described below.

Around the photosensitive drum 1, the following respective units are disposed in order according to a rotating direction thereof. First, a charging device 2 (2a, 2b, 2c, 2d) as a charging unit that uniformly charges the surface of the photosensitive drum 1. Next, a scanner unit 3 (3a, 3b, 3c, 3d) is disposed as an exposure unit that emits a laser beam based on image information to form an electrostatic latent image on the photosensitive drum 1. Next, a development device (development unit) 4 (4a, 4b, 4c, 4d) is disposed as a development unit that causes a toner to adhere to the electrostatic latent image and develops it as a toner image. Next, an electrostatic transfer device 5 is disposed as a transfer unit that causes the toner image on the photosensitive drum 1 to be transferred onto a transfer material S. Next, a cleaning device 6 (6a, 6b, 6c, 6d) is disposed as a cleaning unit that removes a transfer residual toner which has remained on the surface of the photosensitive drum 1 after having been transferred.

The photosensitive drum 1, the charging device 2, the development unit 4, and the cleaning device 6 are integrally joined in a cartridge to form a process cartridge 7.

The photosensitive drum 1 is composed of an organic photoconductor layer (OPC photosensitive member) coated on an outer peripheral surface of, for example, an aluminum cylinder with a diameter of 30 mm. The photosensitive drum 1 is rotatably supported by a supporting member at both end portions in its longitudinal direction (rotational axis line direction). The photosensitive drum 1 is rotationally driven in the arrow X direction (counterclockwise) in FIG. 2, by a driving force transmitted to the one end portion in its longitudinal direction from a driving motor (not illustrated) as a driving source included in the driving device described below is provided.

As the charging device 2, the one using a contact charging method can be used. In the present exemplary embodiment, the charging device 2 is a charging roller, which is a conductive member (conductive roller), formed in a roller shape. The charging roller 2 is caused to abut against the surface of the photosensitive drum 1, and a charging bias voltage is applied to the charging roller 2. Accordingly, the surface of the photosensitive drum 1 is uniformly charged.

Figure 4:
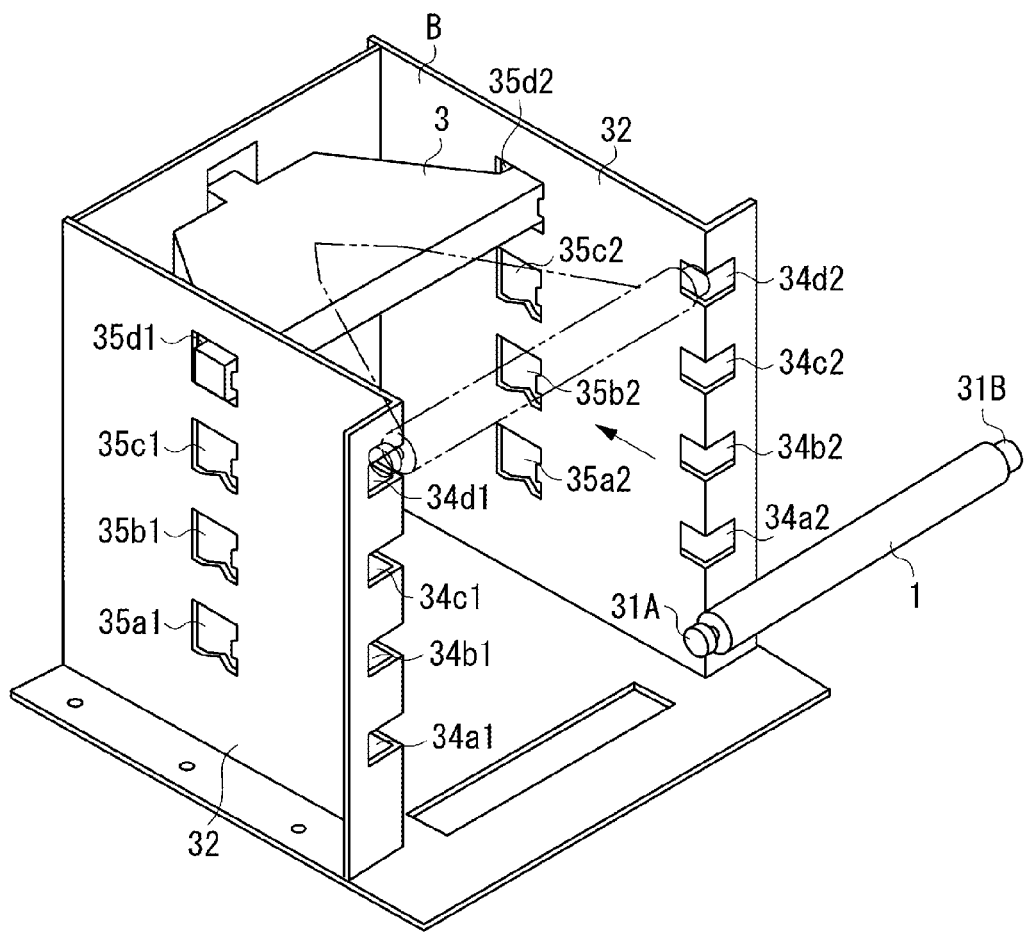
FIG. 4 is a perspective view illustrating a method for attaching a process cartridge to an image forming apparatus according to an exemplary embodiment of the present invention.
Figure 5:
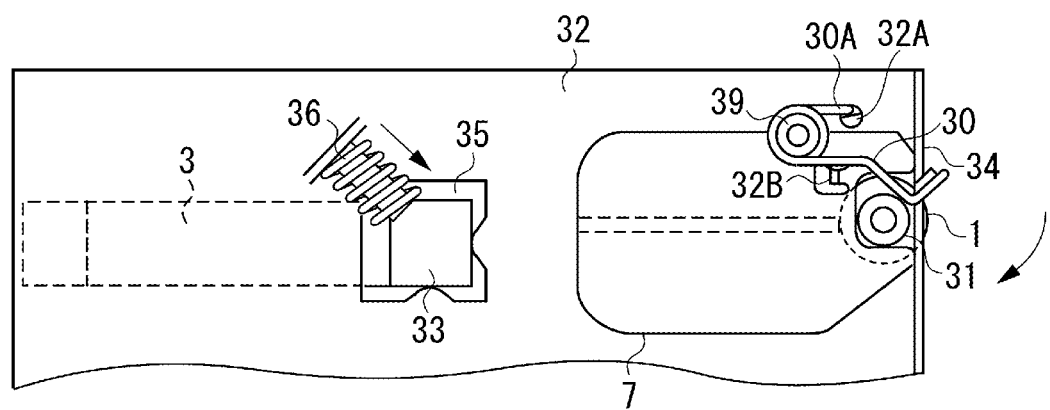
FIG. 5 is a partial cross-sectional view illustrating a positioning portion of a process cartridge relative to an image forming apparatus according to an exemplary embodiment of the present invention.

The scanner unit 3 is arranged in a substantially horizontal direction of the photosensitive drum 1. In the scanner unit 3, an image light corresponding to an image signal from a laser diode (not illustrated) is emitted onto polygon mirrors 9 (9a, 9b, 9c, 9d) rotated at a high speed by the scanner motor (not illustrated). The image light reflected by the polygon mirror 9 selectively exposes the surface of already-charged photosensitive drum 1 via image-forming lenses 10 (10a, 10b, 10c, 10d). In this manner, an electrostatic latent image (electrostatic image) is formed on the photosensitive drum 1. Further, the scanner unit 3, as illustrated in FIG. 4, is formed longer than a pitch between right/left side plates 32 arranged on both end sides in the longitudinal direction (rotation axis direction) of the photosensitive drum 1. Then, as illustrated in FIG. 5, a protruding portion 33 is attached so as to protrude to the outside through an opening hole 35 provided on each of the right/left side plates 32. At that time, the scanner unit 3 is pressed with a force of about 10N about 45° downward indicated by an arrow by a scanner urging spring 36 composed of a compression coil spring, and is pushed against a contact plate provided at the opening hole 35. Accordingly, the scanner unit 3 is surely pressed against the above-described contact plate, and is positioned.

The development units 4 (4a, 4b, 4c, 4d) include toner containers 41 (41a, 41b, 41c, 41d) respectively containing yellow, magenta, cyan, and black color toners, respectively. The toner within the toner container 41 is supplied to a toner supply roller 43 by a feeding mechanism 42. Then, by the toner supply roller 43 as a toner supply member and a development blade 44 as a developer regulating member, toner is applied onto an outer periphery of a developing roller 40 as a developer bearing member, and electric charge is given to the toner. At that time, the toner supply roller 43 rotates in a direction (clockwise) of an arrow Z in FIG. 2, the development blade 44 is brought into pressure contact with the outer periphery of the developing roller 40, and the developing roller 40 rotates in a direction (clockwise) of an arrow Y in FIG. 2. Then, by applying a development bias on the developing roller 40 opposed to the photosensitive drum 1 on which the electrostatic latent image has been formed, toner is supplied to the photosensitive drum 1 according to the electrostatic latent image, and the electrostatic latent image is developed as a toner image.

In the image forming apparatus A, an electrostatic transfer belt 11 is disposed as a transfer material bearing member that circulates, so as to be opposed to all photosensitive drums 1a, 1b, 1c, and 1d. The electrostatic transfer belt 11 comes into contact with all the photosensitive drums 1a, 1b, 1c, and 1d. The electrostatic transfer belt 11 is composed of a film-like member having thickness of about 150 μm and an having volume resistivity value of $10^{11}$ through $10^{14}$ Ωcm. The electrostatic transfer belt 11 is supported by rollers on four axes in the vertical direction, and circulates and moves in order to electrostatically attract the transfer material S onto an outer peripheral surface on the left side in FIG. 1 to bring the transfer material S into contact with each photosensitive drum 1. Accordingly, the transfer material S is conveyed to a transfer portion (transfer position) by the electrostatic transfer belt 11, and the toner image on the photosensitive drum 1 is transferred thereto.

Transfer rollers 12 (12a, 12b, 12c, 12d), each of which is a roller type transfer member, are provided to abut against an inner side of the electrostatic transfer belt 11 at a position opposing to each of the photosensitive drums 1 (1a, 1b, 1c, 1d). Then, electric charge of positive polarity is applied to the transfer material S via the electrostatic transfer belt 11 from each of the transfer rollers 12 (12a, 12b, 12c, 12d). By an electric field induced by the electric charge, the toner image of negative polarity on the photosensitive drum 1 is transferred onto the transfer material S currently being in contact with the photosensitive drum 1.

In the present exemplary embodiment, the electrostatic transfer belt 11 is a belt having a peripheral length of about 700 mm, and a thickness of 150 μm, and is stretched around four rollers: a driving roller 13, idler rollers 14A and 14B, a tension roller 15. The electrostatic transfer belt 11 rotates (circulates and moves) by the driving roller 13 being rotationally driven in an arrow R direction (clockwise) in FIG. 1. Accordingly, while the electrostatic transfer belt 11 is circulating and moving, and the transfer material S is being conveyed from the idler roller 14A side to the driving roller 13 side, the toner image is transferred onto the transfer material S.

A feeding unit 16 is used to feed and convey the transfer material to the image forming unit. In the feeding unit 16, a plurality of sheets of transfer materials S is stored in a feeding cassette 17. At the time of image formation, a feeding roller (a semilunar roller) 18, and a registration roller pair 19 are rotationally driven, according to an image formation operation, and separates and feeds the transfer materials S within the feeding cassette 17 one by one. The transfer material S, when a leading edge thereof hits against the registration roller pair 19, temporarily stops, and forms a loop. After that, the transfer material S is fed to the electrostatic transfer belt 11 that is rotated by the registration roller pair 19, in synchronization with an image writing position.

A fixing unit 20 is used to fix the toner image transferred onto the transfer material S. The fixing unit 20 has a rotatable heating roller 21A, and a pressure roller 21B that comes into pressure contact therewith and exerts heat and pressure to the transfer material S. In other words, the transfer material S onto which the toner image on the photosensitive drum 1 has been transferred, is conveyed by the fixing roller pair 21 (the heating roller 21A and the pressure roller 21B) when passing through the fixing unit 20, and heat and pressure are applied to the transfer material S by the fixing roller pair 21. Accordingly, the toner image is fixed onto the surface of transfer material S.

The image formation operation will be described below taking an example of full-color image formation. The outline is as follows.

Each of the process cartridges 7 (7a, 7b, 7c, 7d) is sequentially driven in synchronization with respective recording timings. According to the drive, each of the photosensitive drums 1 (1a, 1b, 1c, 1d) is rotationally driven. Then, each of the scanner units 3 (3a, 3b, 3c, 3d) respectively corresponding to the process cartridges 7 (7a, 7b, 7c, 7d) is sequentially driven. With this drive, each of the charging rollers 2 (2a, 2b, 2c, 2d) imparts uniform electric charge to a peripheral surface of each of the photosensitive drums 1 (1a, 1b, 1c, 1d). Each of the scanner units 3 (3a, 3b, 3c, 3d) exposes the peripheral surface of each of the photosensitive drums 1 (1a, 1b, 1c, 1d), to form the electrostatic latent image on the peripheral surface of each of the photosensitive drums 1 (1a, 1b, 1c, 1d), according to an image signal. The developing roller 40 of each of the development units 4 (4a, 4b, 4c, 4d) causes the toner to transfer to an exposure portion (low potential portion) of the electrostatic latent image, and forms (develops) the toner image on the peripheral surface of each of the photosensitive drums 1 (1a, 1b, 1c, 1d).

On the other hand, the transfer material S fed at a predetermined timing by the registration roller pair 19 is conveyed to a transfer portion which is a contact portion with each of the photosensitive drums 1 (1a, 1b, 1c, 1d) by the electrostatic transfer conveyance belt 11. The registration roller pair 19 starts rotating in the following manner, and feeds the transfer material S to the electrostatic transfer belt 11. More specifically, a timing when a leading end of the toner image formed on the peripheral surface of the photosensitive drum 1a on the most upstream side in a conveyance direction of the transfer material S is conveyed to the transfer portion which is an opposing portion to the electrostatic transfer belt 11 is ensured to coincide with a timing when a recording starting position of the transfer material S is conveyed to the transfer portion. Further, the transfer material S sandwiched between an electrostatic attraction roller 22 and the electrostatic transfer belt 11 is brought into pressure contact with the outer periphery of the electrostatic transfer belt 11. At that time, a voltage is applied between the electrostatic transfer belt 11 and the electrostatic attraction roller 22. This induces an electric charge to the transfer material S, which is dielectric, and a dielectric layer of the electrostatic transfer belt 11, and electrostatically attracts the transfer material S to the outer periphery of the electrostatic transfer belt 11. Therefore, the transfer material S is stably attracted to the electrostatic transfer belt 11, and is conveyed to the transfer portion on the most downstream side in the conveyance direction of the transfer material S. While the transfer material S is being conveyed in this manner, the toner image of each of the photosensitive drums 1 is sequentially transferred in a superimposed manner onto the transfer material S, by an electric field formed between each of the photosensitive drums 1 and the corresponding one of the transfer rollers 12.

The transfer material S onto which the toner images of four colors have been transferred is separated from the electrostatic transfer belt 11 due to a curvature factor of the belt driving roller 13, and is carried into the fixing unit 20. The toner image of a plurality of colors on the transfer material S is fused and mixed in the fixing unit 20, and is fixed onto the transfer material S.

After the toner image has been fixed in the fixing unit 20, the transfer material S is discharged by a discharge roller pair 23 from a discharge unit 24 to the outside of the apparatus main body B of the image forming apparatus A with the image surface facing downward.

2. Process Cartridge

Figure 3:
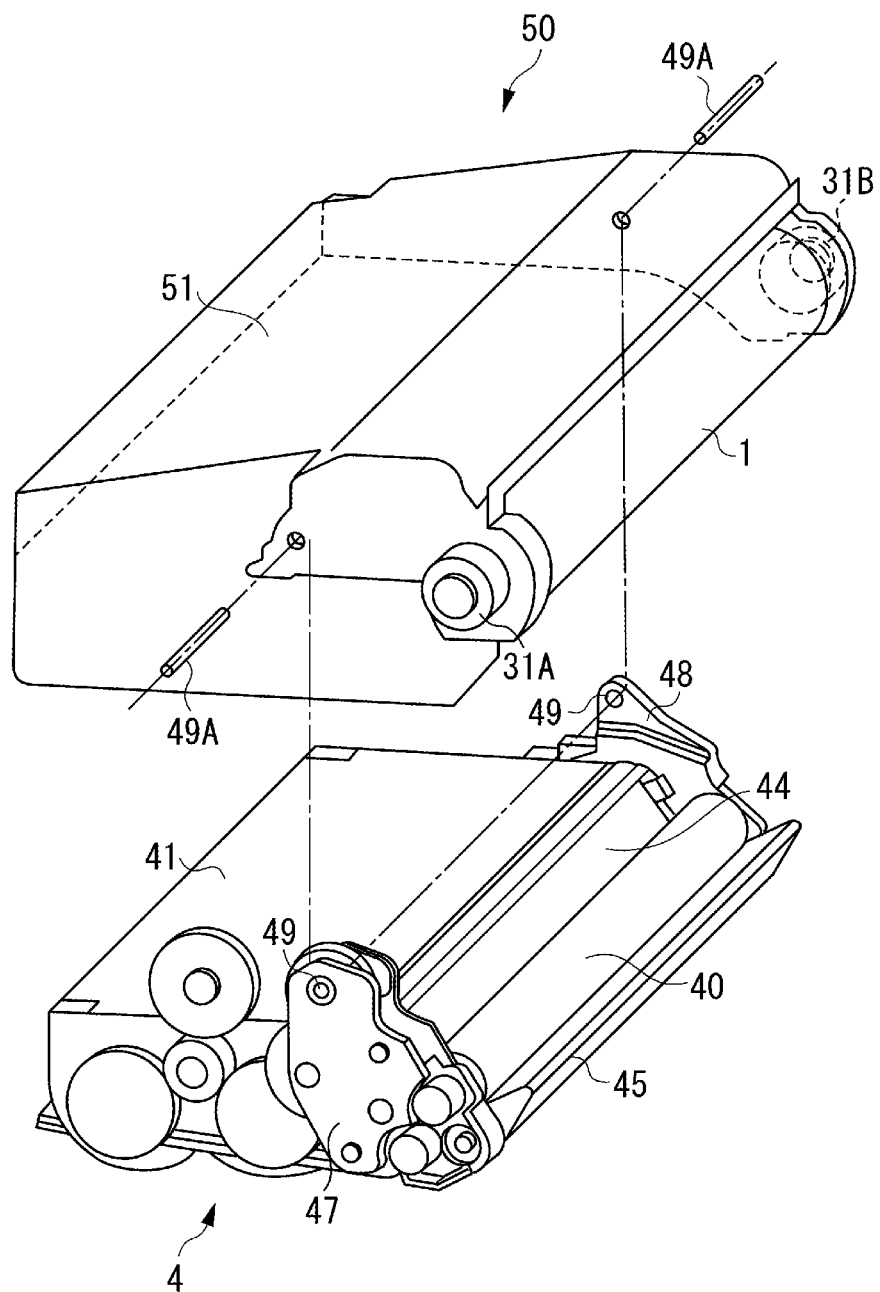
FIG. 3 is a partially exploded perspective view of a process cartridge attachable to and detachable from an image forming apparatus according to an exemplary embodiment of the present invention.

Next, the process cartridge 7 will be described. FIG. 3 is a partially exploded perspective view of the process cartridge 7.

Each of the process cartridges 7a, 7b, 7c, and 7d of yellow, magenta, cyan, and black has the same configuration.

The process cartridge 7 has a photosensitive drum unit 50 including a rotatable drum-like electrophotographic photosensitive member as an image bearing member, that is, the photosensitive drum 1, the charging roller 2 as a charging unit, and the cleaning device 6 as a cleaning unit. Further, the process cartridge 7 has a development unit 4 as a development unit having the developing roller 40 as the developer bearing member that develops the electrostatic latent image on the photosensitive drum 1. The process cartridge 7 is roughly divided into the photosensitive drum unit 50 and the development unit 4.

The photosensitive drum unit 50 has a cleaning frame member 51. The photosensitive drum 1 is rotatably attached to the cleaning frame member 51, via the bearings 31 (31A, 31B). The charging roller 2 for uniformly charging the surface of the photosensitive drum 1, and the cleaning blade 60 for removing developer (toner) which has remained on the photosensitive drum are brought into contact with the outer peripheral surface of the photosensitive drum 1. The toner feeding mechanism 52 is provided in the vicinity of the cleaning blade 60. The toner feeding mechanism 52 is rotationally driven in an arrow X direction (counterclockwise) in FIG. 2 according to the image formation operation, by a driving force from the driving motor being transmitted to one end portion of the left side in FIG. 2 (backward as viewed toward a direction in which the process cartridge 7 is attached to the apparatus main body B). The residual toner on the surface of the photosensitive drum 1 is removed from the surface of the photosensitive drum 1 by the cleaning blade 60. The removed residual toner is sequentially sent to a waste toner chamber 53 provided on the left side in FIG. 2 inside a cleaning frame member 51 (backward as viewed toward a direction in which the process cartridge 7 is attached to the apparatus main body B), by the toner feeding mechanism 52.

The development unit 4 has the toner container 41 in which toner is stored and a development frame member 45. The toner container 41 and the development frame member 45 are integrally joined. The developing roller 40 is supported by the development frame member 45 rotatably via the bearing member. The developing roller 40 comes into contact with the photosensitive drum 1, and rotates in an arrow Y direction (clockwise) illustrated in FIG. 2. The toner supply roller 43 and the development blade 44 are brought into contact with the outer peripheral surface of the developing roller 40. The toner supply roller 43 comes into contact with the developing roller 40 to rotate in an arrow Z direction illustrated in FIG. 2. Within the toner container 41, the feed mechanism 42 for stirring toner stored therein as well as conveying the toner to the toner supply roller 43 is provided. Then, the development unit 4 is configured in a hanging structure in which, the development unit 4 as a whole is supported swingably with respect to the photosensitive drum unit 50 by pins 49A, around supporting shafts 49 each provided on bearing members 47, 48 attached at both ends of the development unit 4.

The development unit 4, when the process cartridge 7 is in a single body state (in a state where it is not attached to the apparatus main body B), is rotated around the supporting shaft 49 so that the developing roller 40 is brought into contact with the photosensitive drum 1. In other words, a pressure spring 54 composed of a compression coil spring is provided between the development frame member 45 and the cleaning frame member 51, and the development unit 4 is constantly urged by the pressure spring 54 so that the developing roller 40 is brought into contact with the photosensitive drum 1 by a rotational moment.

When the developing roller 40 is separated from the photosensitive drum 1, a separating unit described below provided on the apparatus main body B abuts against a rib 46 as a separating action receiver portion. The rib 46 is integrally provided in the toner container 41 of the development unit 4. The rib 46 is provided protrudingly from a left side surface in FIG. 2 (backward as viewed toward a direction in which the process cartridge 7 is attached to the apparatus main body B) of the toner container 41.

3. Attaching Operation of Process Cartridge and Separating Unit

Next, operation mechanism when the process cartridge 7 is attached to the apparatus main body B will be described.

FIG. 4 is a schematic view illustrating an operation for attaching the process cartridge 7 to the apparatus main body B. In FIG. 4, to facilitate understanding, of the process cartridge 7, only the photosensitive drum 1 and the bearings 31 (31A, 31B) are illustrated for simplification.

Figure 6:
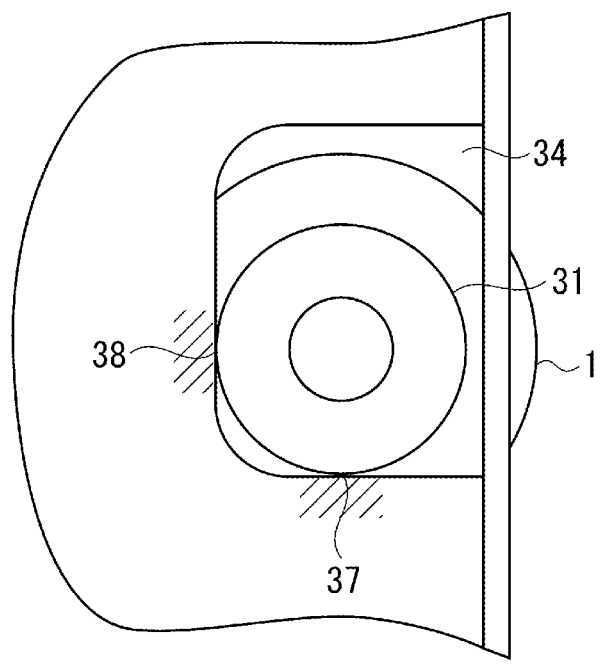
FIG. 6 is a partial cross-sectional view illustrating a positioning portion of a process cartridge relative to an image forming apparatus according to an exemplary embodiment of the present invention.

As described above, the process cartridge 7, in a state of a single body, is in a state where the developing roller 40 is constantly in contact with the photosensitive drum 1 as illustrated in FIG. 2. Attachment of the process cartridge 7 to the apparatus main body B is performed by inserting the bearings 31 (31A, 31B) that support the photosensitive drum 1 along first guide grooves 34 (34a1 through 34d1, 34a2 through 34d2) from an arrow direction illustrated in FIG. 4. Then, as illustrated in FIG. 6, the position of the process cartridge 7 is determined by the bearing 31 being pressed against the abutment surfaces 37 and 38 of the guide groove 34.

As illustrated in FIG. 5, a shaft 39 is swaged to each of the right/left side plates 32 arranged at both end sides of the photosensitive drum in a longitudinal direction (rotation axis direction) 1, and a torsional coil spring 30 is supported by the shaft 39. Then, an end portion 30A of the torsional coil spring 30 fits into a hole 32A formed in each of the right/left side plates 32 and is fixed thereto. In a state where the process cartridge 7 is not present, movement of the torsional coil spring 30 in a rotational direction by its elastic force is regulated, by a bent-up 32B from each of the right/left side plates 32. Then, when the process cartridge 7 is inserted, the torsional coil spring 30 rotates counterclockwise in FIG. 5 while resisting its elastic force, and is positioned as illustrated in FIG. 5 when overriding the bearing 31. In this state, the torsional coil spring 30 presses the process cartridge 7 into the apparatus main body B by a force of about 10N in an arrow direction (clockwise) in FIG. 5.

Figure 7:
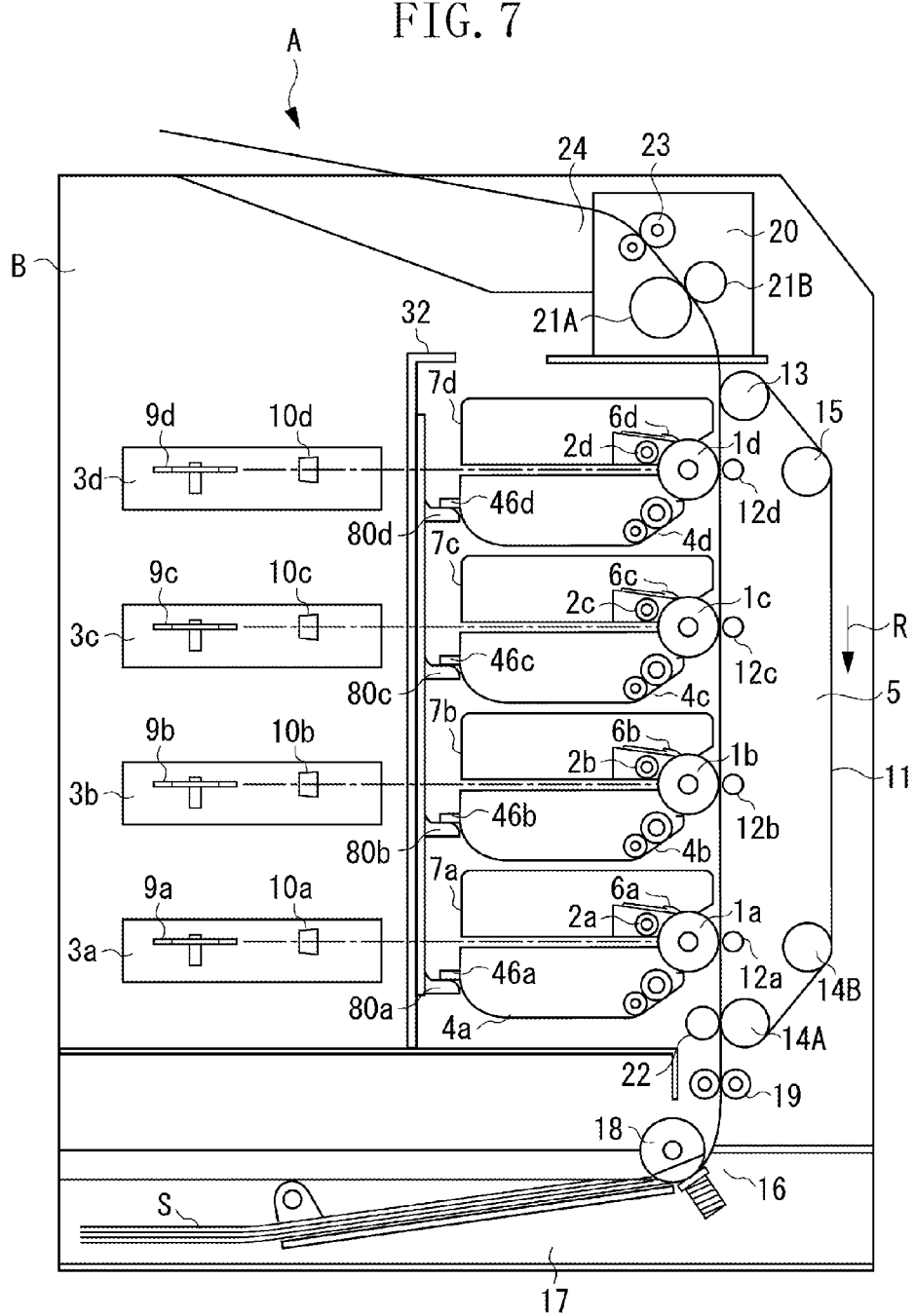
FIG. 7 is a cross-sectional view illustrating a state where developing rollers of all process cartridges abut against the photosensitive drums in the image forming apparatus in FIG. 1.
Figure 8:
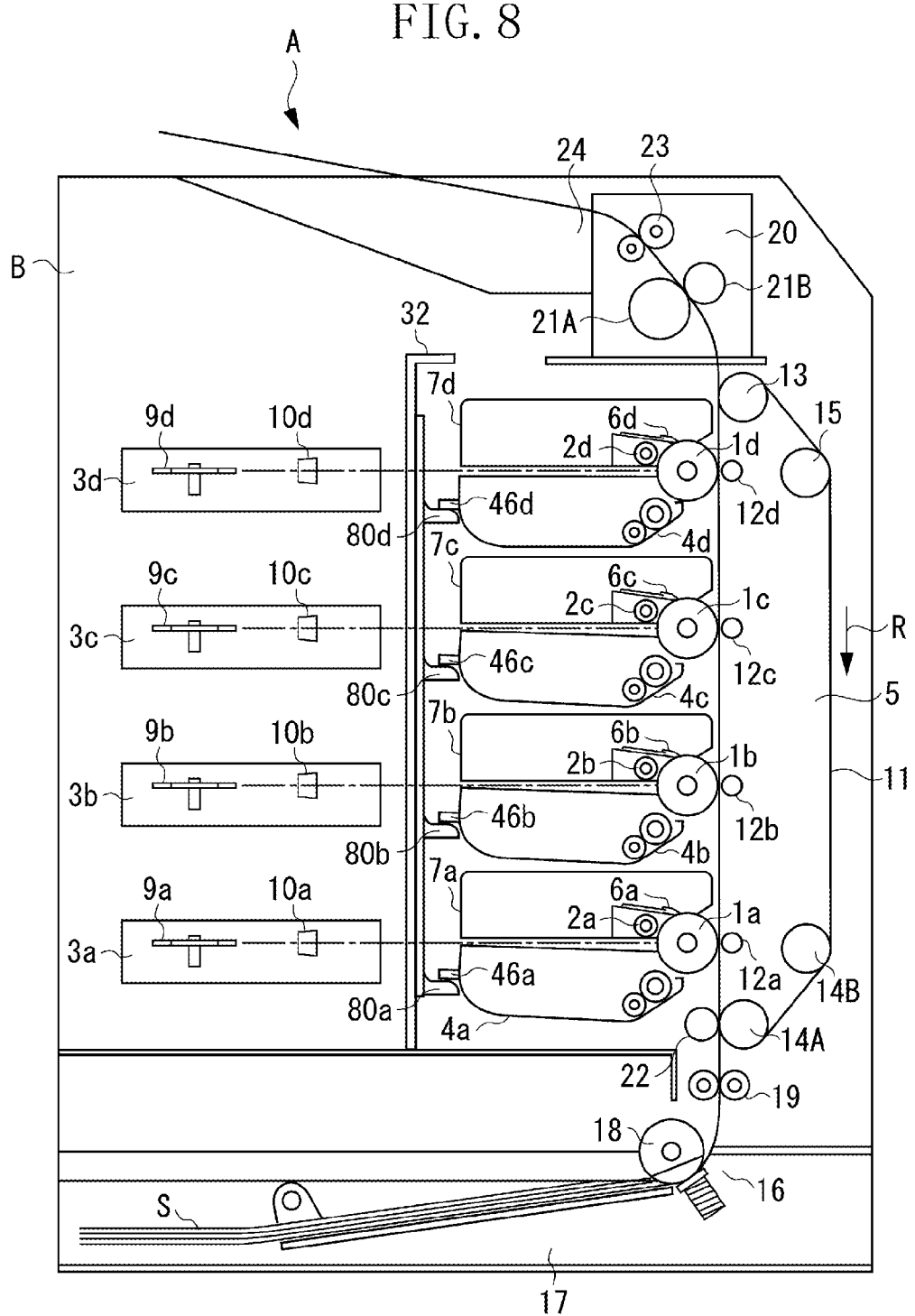
FIG. 8 is a cross-sectional view illustrating a state where the developing roller of a black process cartridge abuts against the photosensitive drum, and the developing rollers of the process cartridges for other colors are separated from the photosensitive drums in the image forming apparatus in FIG. 1.

On a rear side in an insertion direction of the process cartridge 7 of the apparatus main body B, as illustrated in FIGS. 1, 7, and 8, the separating plates 80 (80a, 80b, 80c, 80d) as a separating unit for separating the developing roller 40 from the photosensitive drum 1 are arranged. The separating plates 80a, 80b, 80c, and 80d are provided respectively, in order to push up the ribs 46a, 46b, 46c, and 46d provided in the development units 4 (4a, 4b, 4c, 4d) for respective colors of yellow, magenta, cyan, and black. The separating plate 80 oscillates the development unit 4 with respect to the photosensitive drum unit 50 against the urging force of the pressure spring 54 of the development unit 4, and separates the developing roller 40 from the photosensitive drum 1.

Figure 9:
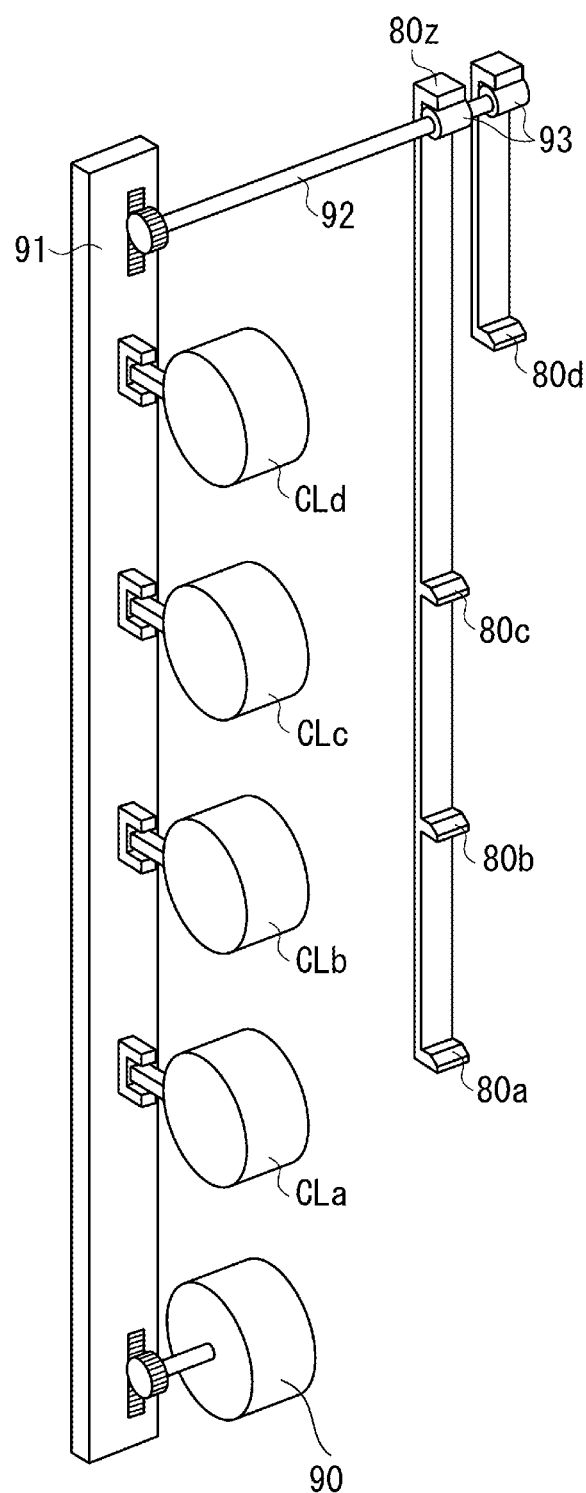
FIG. 9 is a perspective view illustrating an operation switching mechanism according to an exemplary embodiment of the present invention.

A switching plate 91 as a switching member is moved upward and downward in FIG. 9 by a switching motor (stepping motor) 90 as a switching driving unit illustrated in FIG. 9. The gear meshing with the gear formed on the switching plate 91 is fixed to a driving shaft 92. Accordingly, cams 93 fixed to the driving shaft 92 rotate. Then, in a state where the separating plate 80 is pushed up by the cams 93, the rib 46 is pushed up, and the development unit 4 is positioned at a separating position at which the developing roller 40 is separated from the photosensitive drum 1. Further, in a state where the pushing-up of the separating plate 80 by the cams 93 is released, the pushing-up of the rib 46 is released, and the development unit 4 is positioned at a development position (contact position) at which the developing roller 40 is brought into contact with the photosensitive drum 1. In this manner, the development unit 4 is configured movable between the above-described separating position and development position. Only at the time of development operation, the pushed-up state of the separating plate 80 is released, and the development unit 4 is moved to the development position.

Structure can be relatively simplified by restricting operation modes of pushing-up and releasing of the separating plate 80. More specifically, the first mode is a standby state (FIG. 1) in which the separating plates 80 for all colors of yellow, magenta, cyan, and black are pushed up. The second mode is a full-color state (FIG. 7) in which pushing-up state of the separating plates 80 for all colors of yellow, magenta, cyan, and black is released. The third mode is a mono-color state (FIG. 8) in which the separating plates 80 for only three colors of yellow, magenta, and cyan are pushed up. In the present exemplary embodiment, these three states can be selected.

Therefore, in the present exemplary embodiment, as illustrated in FIG. 9, the separating plates 80 have two types of the separating plate 80d for black, and a separating plate 80z for colors in which the separating plates 80a, 80b, and 80c for respective colors of yellow, magenta and cyan are integrated. Then, switching between the above-described modes becomes possible, by providing two types of profiles corresponding to the respective separating plates to the cams 93 that move the separating plate 80d for black and the separating plate 80z for colors.

4. Driving Device

Figure 10:
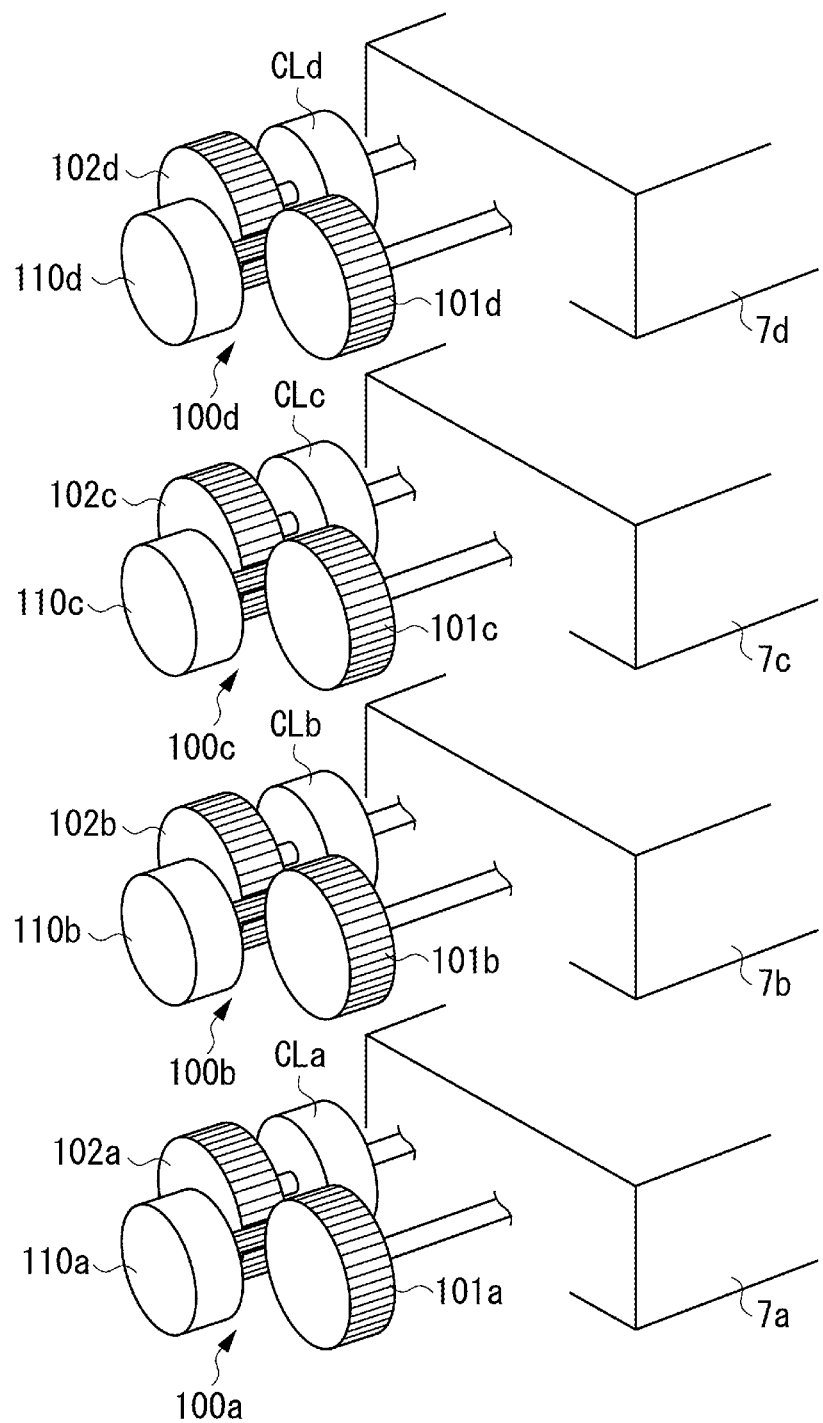
FIG. 10 is a perspective view of the driving devices that drive the process cartridges according to an exemplary embodiment of the present invention.

As illustrated in FIG. 10, the image forming apparatus A has the driving devices (driving units) 100 (100a, 100b, 100c, 100d) as a driving unit that drives the cartridge 7 in the apparatus main body B. In the present exemplary embodiment, the driving device 100 has one driving motor 110 as a driving source for each color. Then, the drive of the driving motor 110 is transmitted by branching the drive into a first line 101 that drives the photosensitive drum 1 as a first driven member, and a second line 102 that drives the developing roller 40 as a second driven member. The driving device 100 has a clutch CL on the motor 110 side, in the second line 102, and allows switching to rotation or stop state of the developing roller 40, at the time of rotation of the photosensitive drum 1.

Figure 11:
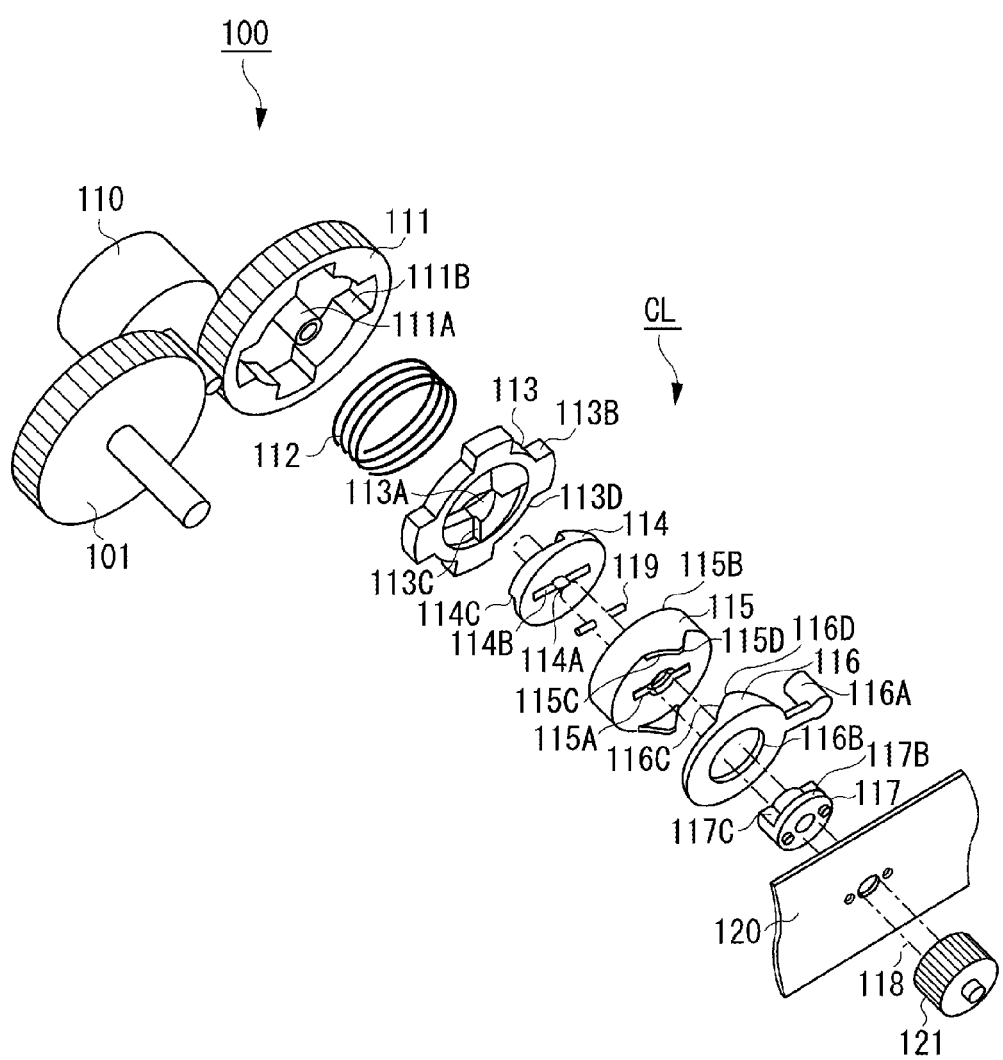
FIG. 11 is an exploded perspective view illustrating a mechanical clutch of the driving device according to an exemplary embodiment of the present invention.
Figure 12A:
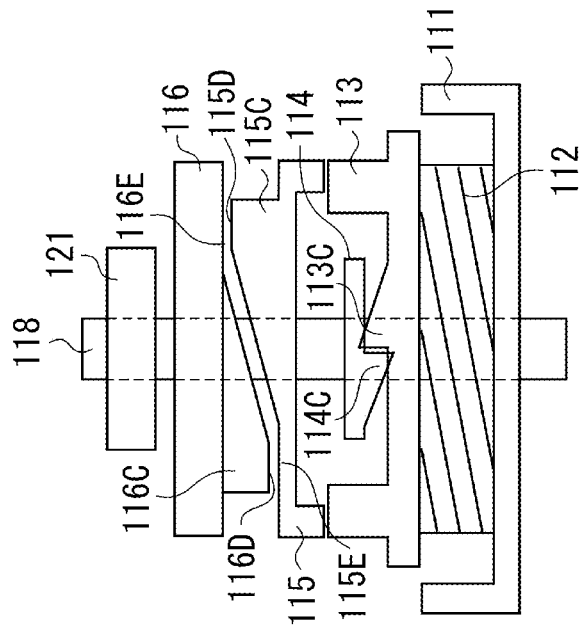
FIGS. 12A and 12B are schematic cross-sectional views respectively illustrating a state at a time of releasing, and at a time of coupling of the mechanical clutch of the driving device according an exemplary embodiment of the present invention.
Figure 12B:
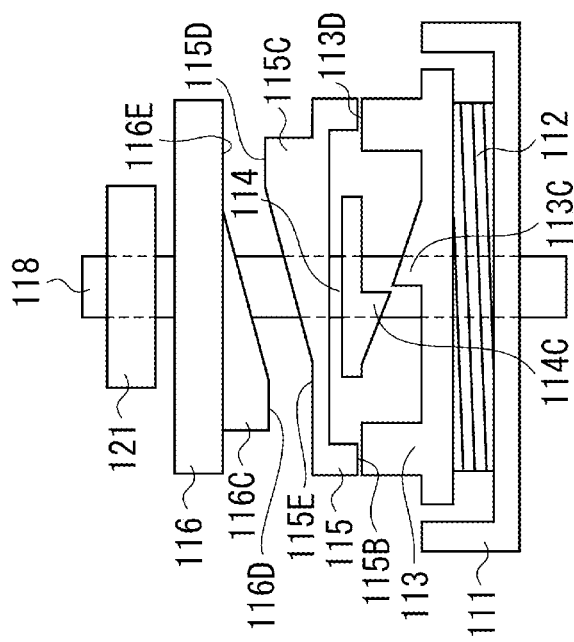
Figure 13:
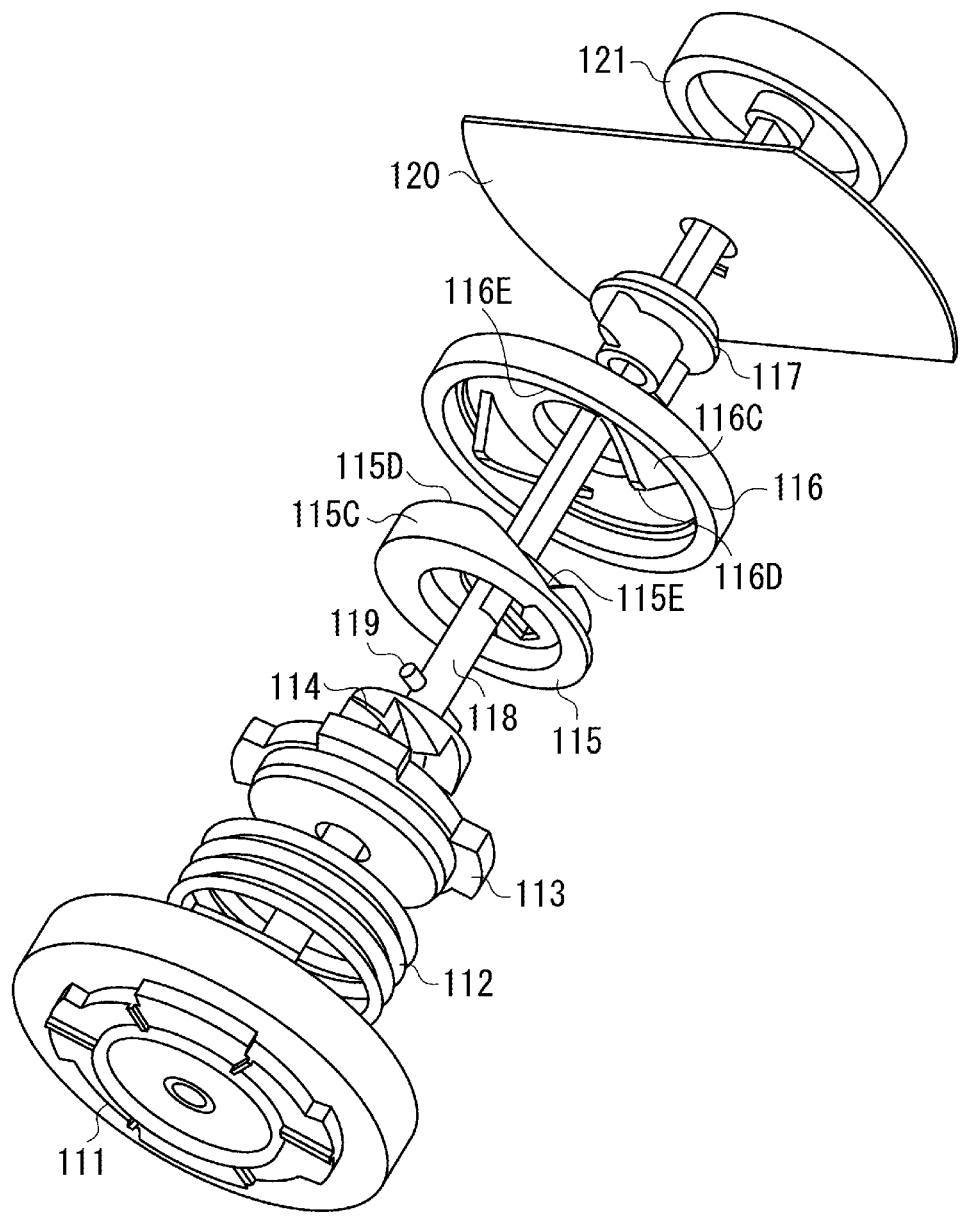
FIG. 13 is an exploded perspective view of the mechanical clutch of the driving device according to an exemplary embodiment of the present invention.

Next, the clutch CL of the driving device 100 will be described in more detail. FIG. 11 is an exploded perspective view of one specific example of the mechanical clutch CL included in the driving device 100 according to the present exemplary embodiment. FIG. 12 is a schematic cross-sectional view illustrating a state at the time of coupling or releasing of the mechanical clutch CL included in the driving device 100 according to the present exemplary embodiment. FIG. 13 is an exploded perspective view (as viewed from the opposite direction of that illustrated in FIG. 11) of another specific example of the mechanical clutch included in the driving device 100 according to the present exemplary embodiment. In FIGS. 12A and 12B, FIG. 13, a lever portion 116A of a cam member 116 described below indicated in FIG. 11 is omitted.

A gear 111 as a driving member which meshes with the motor 110 is rotatable with respect to a rotating shaft 118 on an idler side by a fixing member (not illustrated), and an axial position of the driving member is fixed. The inner side of the gear 111 is subjected to large wall thinning, an inner periphery of a sliding boss 111A in the vicinity of the center becomes a positioning and sliding surface with respect to the rotating shaft 118 on the idler side, and an outer periphery becomes a positioning and sliding surface of a driving side engaging member 113. Similarly there are four detents 111B in the vicinity of an outer periphery of the inner side of the gear 111, which serve as a detent of the driving side engaging member 113.

The driving side engaging member 113 is slidably supported by an inner peripheral surface 113A fitting into an outer peripheral portion of the sliding boss 111A of the gear 111. At the same time, the driving side engaging member 113 rotates (the same rotation) in synchronization with the gear 111, by the detents 113B provided on the outer peripheral portion meshing with the detents 111B of the gear 111. On the other hand, the driving side engaging member 113 has protrusions 113C at four positions, and can transmit rotation when the protrusions 113C mesh with protrusions 114C of the idler side engaging member 114.

Each of the drive transmission surfaces of the protrusions 113C is formed with a slope in a direction of biting a partner member by rotation. Accordingly, even when the clutch is connected while rotating, the protrusions securely mesh with each other, and even when a large torque is applied, jumping does not occur. Further, by connecting the drive transmission surfaces of the protrusions 113C with a gentle slope, the protrusions can be smoothly engaged with each other even when the clutch is connected while rotating.

On an end surface on an idler side of the driving side engaging member 113, there is provided a sliding portion 113D that rotationally slides with a releasing member 115 described below. Further, the driving side engaging member 113 is constantly urged in a direction of the idler side engaging member 114 by an engaging member urging spring 112 formed of a compression coil spring which is an elastic member as an urging unit.

The idler side engaging member 114 is fixed by the rotating shaft 118 and a parallel pin 119 that fit into an inner peripheral surface 114A and a groove 114B, respectively. Further, when the protrusions 114C at four spots mesh with the protrusions 113C of the driving side engaging member 113, rotation is transmitted. The drive transmission surfaces of the protrusions 114C are inclined in a biting direction, similar to the partner members 113C, and the drive transmission surfaces are connected by a gentle slope.

In this manner, the driving side engaging member 113 and the idler side engaging member 114 have a plurality of drive transmission surfaces inclined in a direction in which they bite each other when they engage with each other, and the drive transmission surfaces are arranged symmetrically against the center of rotation.

The driving side engaging member 113, the idler side engaging member 114, and the engaging member urging spring 112 are encapsulated on the inner side of the gear 111. Accordingly, they can be assembled compact by effectively using a space. Since a driving force transmitted from tooth surface is transmitted directly to the inner side, a force of torsion or slant does not occur on the engaging members, member strength can be easily secured, and transmission of a large torque becomes possible.

The rotating shaft 118 is rotatably supported with respect to a frame 120 of the driving device 100, via a bearing member 117, and transmits rotation to a development driving portion (the developing roller 40 in the present exemplary embodiment) of the process cartridge 7 from a gear 121 fixed at an end portion. The bearing member 117 is fixed to the frame 120 of the driving device 100, has a detent function and positioning function on an outer perimeter portion, and has two sliding portions: a sliding portion 117C slidable axially, and a cylindrical surface 117B slidable in a rotation direction.

The cam member 116 fits in the cylindrical surface 117B of the bearing member 117 to rotate, and a lever portion 116 is operated by the switching plate 91 as a switching member. The cam member 116 has a cam portion 116C, and the cam portion 116C abuts against a cam portion 115C of the releasing member 115 to control an axial position of the releasing member 115. Further, the cam portions 115C and 116C each consisting of two or more pieces (two in the present exemplary embodiment) are provided symmetrically with respect to the center of rotation. Accordingly, increase of operation failure or operation resistance by the releasing member 115 being inclined can be prevented.

Since a sliding portion 115A on the inner side of the releasing member 115 is configured to fit in the sliding portion 117C of the bearing member 117, rotation of the releasing member 115 is regulated, and the releasing member 115 is supported in an axially movable manner. The cam portion 115C of the releasing member 115 is formed in a shape corresponding to the cam portion 116C of the cam member 116. The cam portion 115C of the releasing member 115 abuts against the cam portion 116C of the cam member 116, thereby determining an axial position of the releasing member 115. At the same time, a sliding portion 115B on the opposite side to the cam portion 115C of the releasing member 115 abuts against the driving side engaging member 113, thereby determining a position of the driving side engaging member 113.

More specifically, in a state where a crest of the cam portion 116C of the cam member 116 and a crest of the cam portion 115C of the releasing member 115 mate with each other, the releasing member 115 is pushed out in a direction of the gear 111. Accordingly, the sliding portion 115B abuts against the sliding portion 113D of the driving side engaging member 113, and the driving side engaging member 113 is detached from the idler side engaging member 114 against the engaging member urging spring 112. Therefore, the operation goes into a state which is called a declutched state.

When the motor 110 rotates in this state, the sliding portions 113D and 115B slide and the clutch is thrown out and there is no load on the idler side, losses due to sliding resistance do not cause a problem.

On the other hand, in a state where the cam member 116 is rotated, and a crest and a root of the cam portion 116C of the cam member 116 and the cam portion 115C of the releasing member 115 mate with each other, the releasing member 115 moves toward the gear 121 on the idler side. Accordingly, the driving side engaging member 113 is pressed by an elastic force of the engaging member urging spring 112, and is meshed with the idler side engaging member 114. Therefore, the clutch is connected, and thus rotation is transmitted.

The developing roller 40 of the development device to be used can be rotated, and the developing roller 40 of the development device not to be used can be stopped, in interlock with switching operation to three states, for example, the above-described standby state, full-color state, and mono-color state. In this case, cam shapes of the cam member 116 and the releasing member 115 can be made different for black and for other colors. For example, cams for black, as illustrated in FIG. 11, are formed to be a shape so that heights of both cam shapes of the cam member 116 and the releasing member 115 gradually become higher toward one apex. By employing such a shape, apex and apex of the crests abut against each other in a home position and the clutch is thrown out. Then, the clutch is connected, even when the cam member 116 is rotated in any direction from there. Regarding the cam shapes for other colors, as illustrated in FIG. 13, for example, while making the cam shape of the cam member 116 the same as the one for black, the cam shape of the releasing member 115 is made as follows. That is, one side has the similar slope to the one for black, and the other side has a flat portion with the same height as the apex. By employing such a shape, the clutch is thrown out in a home position, and when the cam member 116 is rotated from that position in a direction in which the crest and root of the cams abut against each other, the clutch is connected, but the clutch remains thrown out even when the cam member 116 is rotated to the opposite side. With such a configuration, it becomes possible to simply set the mono-color state where only a clutch for black CLd is connected and a full-color printing state where all clutches CL are connected, based on the home position.

Further, as illustrated in FIG. 9, switching operation between the clutch CL of a driving system of the development device 4 and the cam 93 that moves the separating plate 80 can be carried out by moving the switching plate 91 upward and downward using one set of the switching motor 90. Accordingly, by setting a rotation direction and rotation amount of the switching motor 90, and a profile of the cam 93 as appropriate, abutting or separating state of the developing roller 40 against or from the photosensitive drum 1, and driving or stop state of the development unit 4 can be switched in association with each other. In the present invention, the switching operation itself can be carried out as appropriate and arbitrarily, and therefore the further descriptions will be omitted.

A state where crest and crest of the cam portion 116C of the cam member 116 and the cam portion 115C of the releasing member 115 mate with each other, is a state where the clutch is thrown out. Then, by rotating the cam member 116 from that state, and by putting into a state where crest and root of the cam portion 116C of the cam member 116 and the cam portion 115C of the releasing member 115 mate with each other, the operation is switched to a state where the clutch is connected. At that time, the releasing member 115 collides against the cam member 116, by an urging force of the engaging member urging spring 112. There is a possibility that rotation of the photosensitive drum 1 which is the most important in terms of image formation is caused to be unstable by that shock.

Therefore, one of the objectives of the present exemplary embodiment is to drive the photosensitive drum 1 and the development device 4 using one set of the motor 110, and to reduce an influence to the drive of the photosensitive drum 1 by shock at the time of coupling or releasing of the mechanical clutch CL by virtue of configuration of providing the mechanical clutch CL to a driving system of the development device 4. Further, one of other objectives of the present exemplary embodiment is to provide the driving device 100 employing the mechanical clutch CL smaller in size and lower in cost, capable of transmitting stable rotation even when the drive side is rotating, and especially effective in an inline color image forming apparatus.

In the present exemplary embodiment, in at least one of the releasing member 115 and the cam member 116, at least a position where collision occurs when the releasing member 115 has moved axially in such a manner that the releasing member 115 and the cam member 116 come closer to each other, is composed of an elastic member.

For example, the cam portion 115C of the releasing member 115 slides down along the cam surface of the cam portion 116C of the cam member 116, and an apex 115D of the crest of the cam portion 115C of the releasing member 115 collides against a base portion 116E in the vicinity of a rising starting point of the cam portion 116C. In this case, at least one of the above-described apex 115D of the cam portion 115C of the releasing member 115 and the above-described base portion 116E of the cam member 116 is formed of an elastic member. With this configuration, shock caused by collision of the releasing member 115 and the cam member 116 can be alleviated. Alternatively, the cam portion 116C of the cam member 116 slide down along the cam surface of the cam portion 115C of the releasing member 115, and the apex 116D of the crest of the cam portion 116C of the cam member 116 collides with a base portion 115E in the vicinity of a rising starting point of the cam portion 115C of the releasing member 115. In this case, at least one of the above-described apex 116D of the cam portion 116C of the cam member 116 and the above-described base portion 115E of the releasing member 115 is formed of an elastic member. With this configuration, shock caused by collision of the releasing member 115 with the cam member 116 can be alleviated. Typically, at least one of the entire members of the cam member 116 and the releasing member 115 can be formed of the elastic member. Both the entire members of the cam member 116 and the releasing member 115 may be formed of the elastic member.

As a material of the elastic member, thermoplastic elastomer such as thermoplastic polyeterester elastomer can be used.

In this way, in the present exemplary embodiment, the driving device 100 rotationally drives the first driven member 1 and the second driven member 40 using one driving source, and has the clutch CL that couples or releases a drive to the second driven member 40. Then, the clutch CL has the gear (driving member) 111 that transmits a drive from the driving source side to the rotating shaft on the idler side, and the driving side engaging member 113 that rotates in synchronization with the gear (driving member) 111, and is movable axially. Further, the clutch CL has the idler side engaging member 114 that is fixed to the rotating shaft on the idler side, and engages with the driving side engaging member 113, and the urging unit 112 that urges the driving side engaging member 113 in a direction in which the driving side engaging member 113 meshes with the idler side engaging member 114. Further, the clutch CL has the releasing member 115 provided with a cam surface, which moves axially the driving side engaging member 113 to perform engagement or release of the driving side engaging member 113 and the idler side engaging member 114, and the cam member 116 provided with a cam surface that engages with the cam surface of the releasing member 115. Then, in the present exemplary embodiment, in at least one of the releasing member 115 and the cam member 116, at least one of the collision areas of the releasing member 115 and the cam member 116, which may be collided with each other when the releasing member 115 moves axially in a direction to approach the cam member 116, is formed of the elastic member.

Accordingly, with a simple configuration, shock caused by collision of the releasing member 115 with the cam member 116 can be alleviated, and rotational drive of the photosensitive drum 1 can be performed in a stable state. Therefore, it becomes possible to reduce a possible occurrence of defects such as streaks on images.

As described above, according to the present exemplary embodiment, the photosensitive drum 1 and the development device 4 are driven by the one motor 110, and rotation and stop of the development device 4 are controlled by the mechanical clutch CL. Accordingly, the low cost and small size development device 4 and further reduction of consumption or deterioration of the developer can be realized. In addition, according to the present exemplary embodiment, shock caused by collision at the time of coupling or releasing of the mechanical clutch CL can be alleviated, and possible occurrences of faulty images resulting from the collision can be reduced.

Next, a second exemplary embodiment of the present invention will be described. In the driving device and the image forming apparatus according to the present exemplary embodiment, components having functions, or configurations the same as or equivalent to those in the first exemplary embodiment are assigned the same reference numerals, and the detailed descriptions thereof will not be repeated.

Figure 14A:
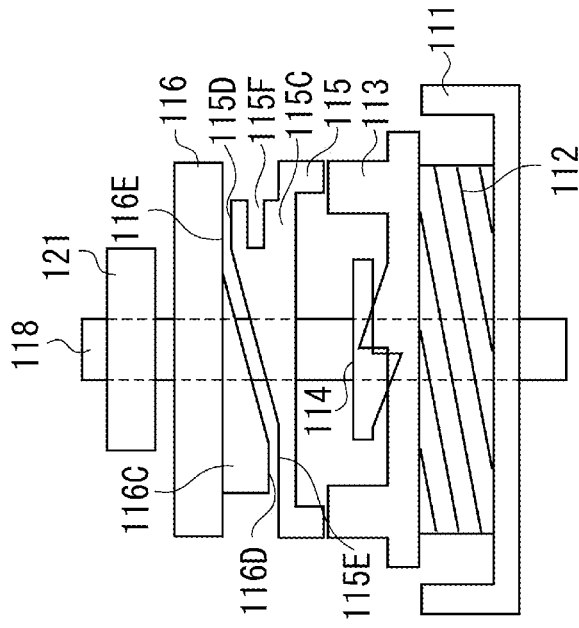
FIGS. 14A and 14B are schematic cross-sectional views respectively illustrating a state at a time of releasing, and at a time of coupling of a mechanical clutch of a driving device according to another exemplary embodiment of the present invention.
Figure 14B:
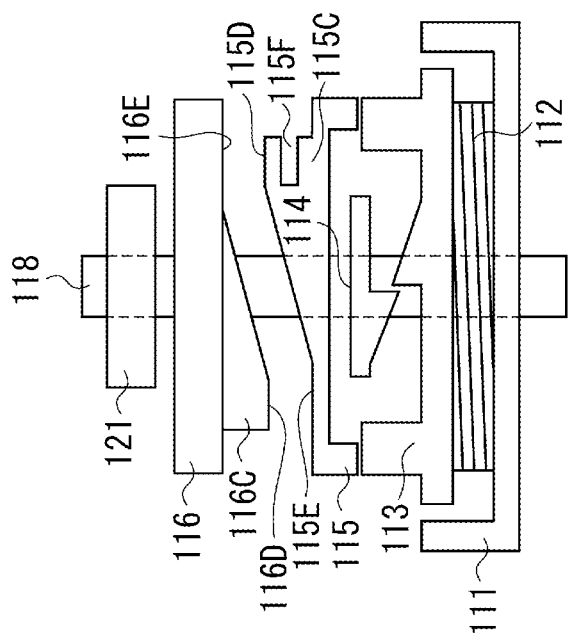
Figure 15:
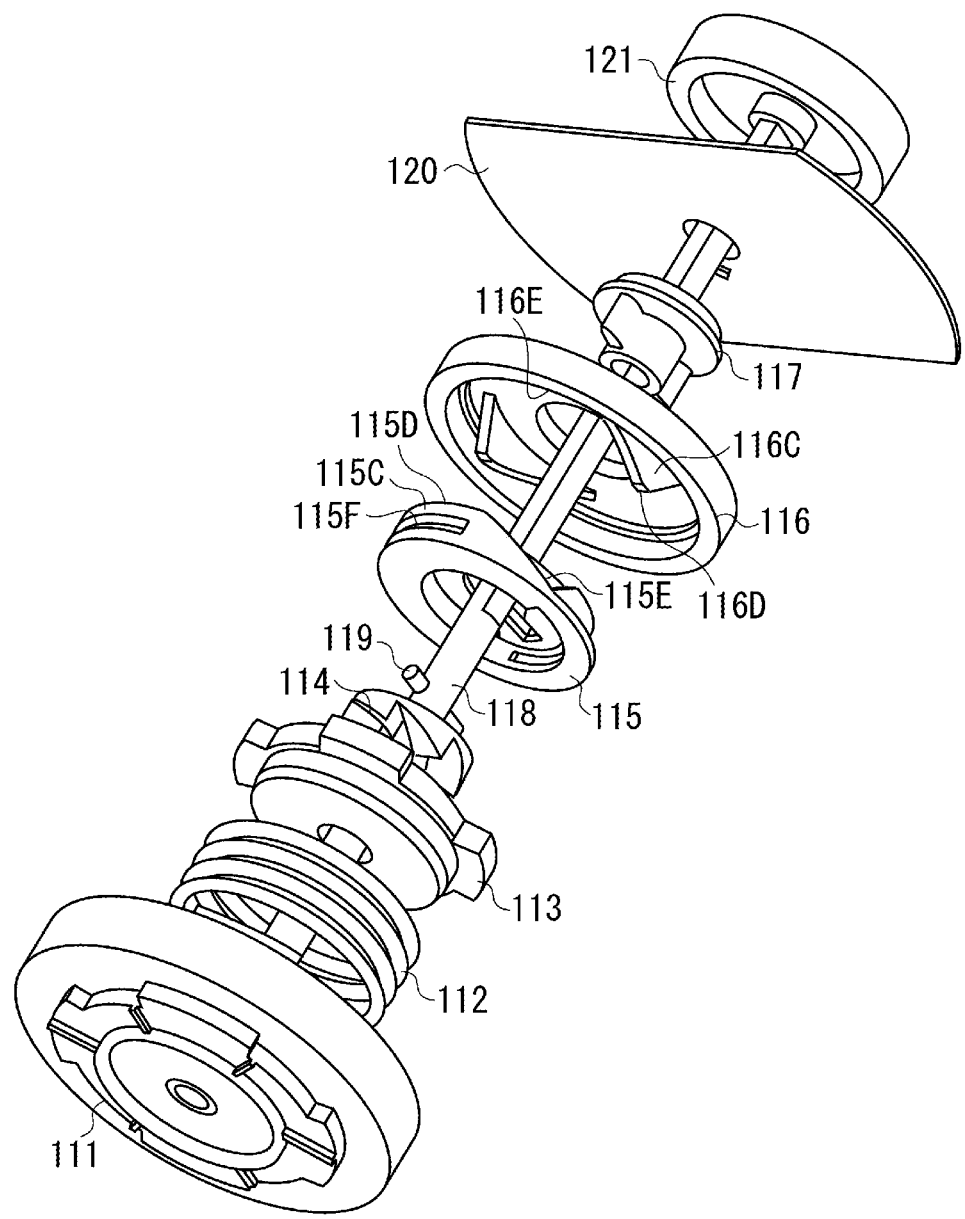
FIG. 15 is an exploded perspective view of the mechanical clutch of the driving device according to the another exemplary embodiment of the present invention.

FIGS. 14A and 14B are schematic cross-sectional views respectively illustrating a state at a time of coupling and releasing of the mechanical clutch CL included in the driving device 100 according to the present exemplary embodiment. FIG. 15 is an exploded perspective view of a specific example of the mechanical clutch CL included in the driving device 100 according to the present exemplary embodiment.

In the present exemplary embodiment, another method for reducing shock caused by collision of the cam member 116 with the releasing member 115 is used.

In the present exemplary embodiment, the releasing member 115 collides with the cam member 16 when moving axially to approach the cam member 16, and in at least one of the releasing member 115 and the cam member 116, an empty wall is provided backward in the above-described approaching direction of the collision area. More specifically, an opening portion (wall thinning portion) 115F is provided on a wall backward in the above-described approaching direction of the above-described collision area and is made hollow. In other words, in the present exemplary embodiment, by partially subjecting the cam member 116 to the wall thinning, the area where the releasing member 115 and the cam member 116 collide with each other has a protruding portion which protrudes in a direction orthogonal to an axis line direction. The protruding portion is elastically deformable in the axial direction, when the releasing member 115 and the cam member 116 collide with each other.

For example, the cam portion 115C of the releasing member 115 slide down along the cam surface of the cam portion 116C of the cam member 116, and the apex 115D of the crest of the cam portion 115C of the releasing member 115 collides against the base portion 116E in the vicinity of the rising starting point of the cam portion 116C of the cam member 116. In this case, an empty wall is provide backward in at least one of the above-described apex 115D of the cam portion 115C of the releasing member 115 and the above-described base portion 116E of the cam member 116. With this configuration, by the above-described apex 115D or the above-described base portion 116E in front of the empty wall being bent (elastically deformed) by collision, shock caused by collision between the releasing member 115 and the cam member 116 can be alleviated. Alternatively, the cam portion 116C of the cam member 116 slides down along the cam surface of the cam portion 115C of the releasing member 115, and the apex 116D of the crest of the cam portion 116C of the cam member 116 collides with the base portion 115E in the vicinity of the rising starting point of the cam portion 115C of the releasing member 115. In this case, an empty wall is provided in the rear of at least one of the above-described apex 116D of the cam portion 116C of the cam member 116, and the above-described base portion 115E of the releasing member 115. Accordingly, by the above-described apex 116D and the above-described base portion 115E in front of the empty wall being bent (elastically deformed) by collision, shock caused by collision between the releasing member 115 and the cam member 116 can be alleviated.

In other words, in the present exemplary embodiment, the releasing member 115 collides with the cam member 16 when moving axially to approach the cam member 16, and in at least one of the releasing member 115 and the cam member 116, an empty wall is provided backward in the above-described approaching direction of the collision area.

As illustrated in FIGS. 14A, 14B, and 15, in the present exemplary embodiment, the rear of the apex 115D of the cam portion 115C of the releasing member 115 is formed of an empty wall, that is, a hollow wall provided with an opening portion (wall thinning portion) 115F.

In this way, by providing the empty wall in at least one of the cam member 116 and the releasing member 115, with a simple configuration, shock caused by collision between the releasing member 115 and the cam member 116 can be alleviated, and rotational drive of the photosensitive drum 1 can be performed in a stable state. Therefore, it becomes possible to reduce possible occurrence of defects such as streaks on images.

Next, a third exemplary embodiment of the present invention will be described. In the driving device and the image forming apparatus according to the present exemplary embodiment, components having the functions, configurations the same as or equivalent to those in the first exemplary embodiment are assigned the same reference numerals, and descriptions thereof will not be repeated.

Figure 16:
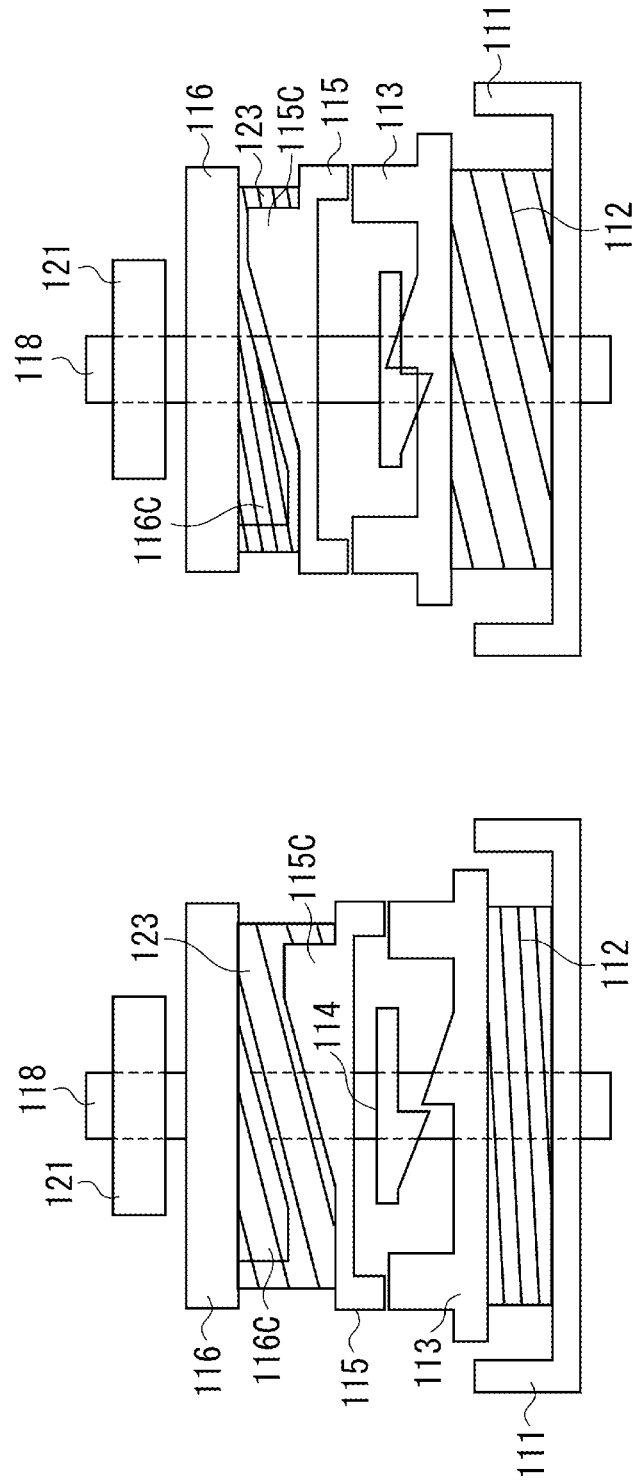
FIGS. 16A and 16B are schematic cross-sectional views each illustrating a state at a time of releasing, or at a time of coupling of a mechanical clutch of a driving device according to yet another exemplary embodiment of the present invention.
Figure 17:
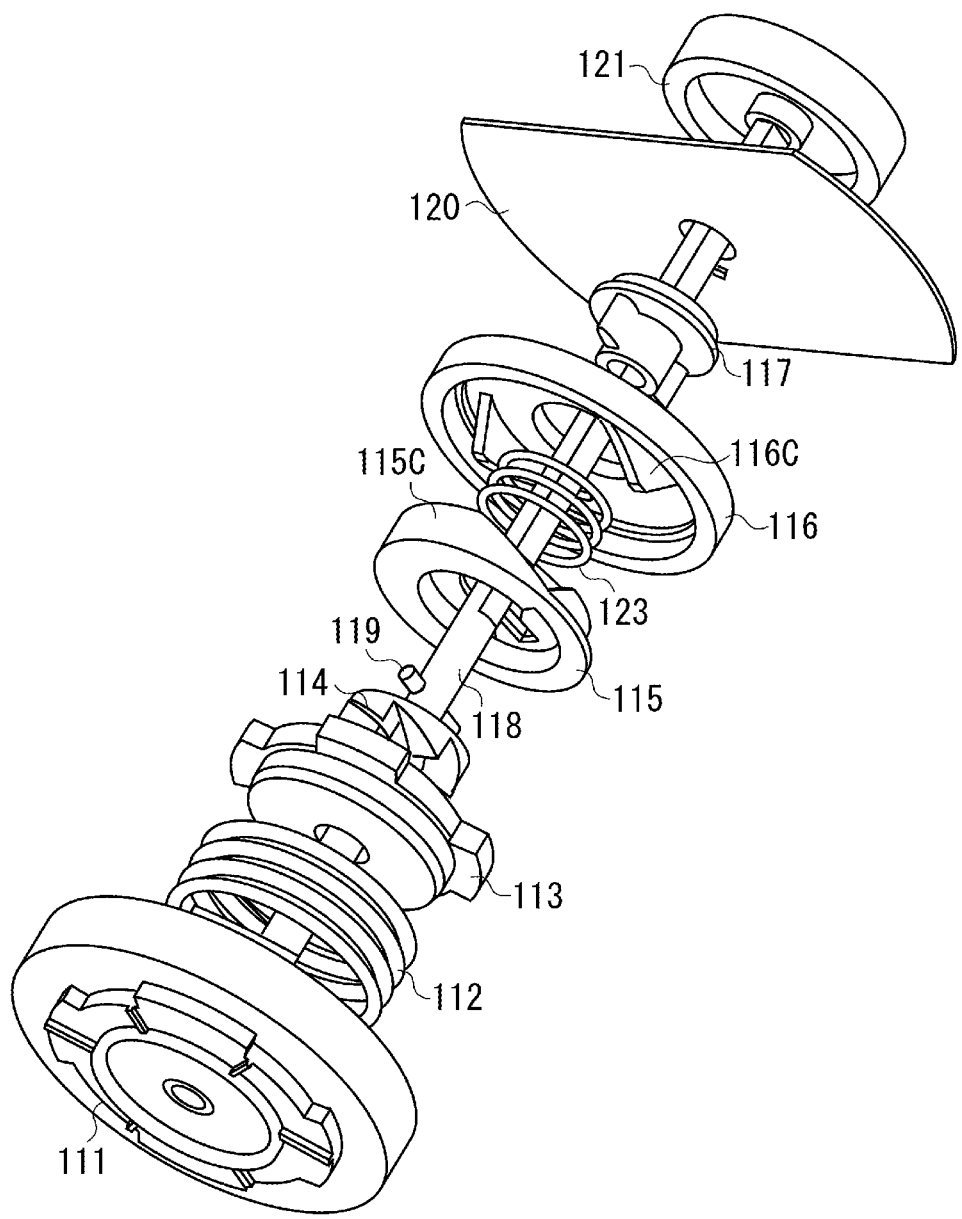
FIG. 17 is an exploded perspective view of the mechanical clutch of the driving device according to the yet another exemplary embodiment of the present invention.

FIGS. 16A and 16B are schematic cross-sectional views respectively illustrating a state at a time of coupling and releasing of the mechanical clutch CL included in the driving device 100 according to the present exemplary embodiment. FIG. 17 is an exploded perspective view of a specific example of the mechanical clutch CL included in the driving device 100 according to the present exemplary embodiment.

In the present exemplary embodiment, yet another method for reducing shock caused by collision between the cam member 116 and the releasing member 115, is used.

In the present exemplary embodiment, a shock absorbing spring 123 composed of a compression coil spring which is an elastic member as a second urging unit is provided, between the releasing member 115 and the cam member 116. The shock absorbing spring 123 urges the releasing member 115 in an opposite direction to an urging direction of the engaging member urging spring 112 as the first urging unit, and the urging force is smaller than the urging force of the engaging member urging spring 112.

For example, as illustrated in FIG. 17, the shock absorbing spring 123 can be provided on an inner side in a radial direction of the cam portion 115C and 116C of the releasing member 115 and the cam member 116. Alternatively, the shock absorbing spring 123 may be provided on an outer side in the radial direction of the cam portion 115C and 116C of the releasing member 115 and the cam member 116.

In other words, in the present exemplary embodiment, the clutch CL has a first urging unit 112 that urges the driving side engaging member 113 in a direction in which the driving side engaging member 113 meshes with the idler side engaging member 114, and a second urging unit 123 provided between the releasing member 115 and the cam member 116. The second urging unit 123 urges the releasing member 115 in the opposite direction to the urging direction of the first urging unit 112, and the urging force is smaller than the urging force of the first urging unit 112.

In this way, the shock absorbing spring 123 is provided between the cam member 116 and the releasing member 115 so that an urging force in an opposite direction to the urging force of the engaging member urging spring 112 works, and an urging force of the shock absorbing spring 123 is smaller than the urging force of the engaging member urging spring 112. With this configuration, the shock absorbing spring 123 would not impede the cam portion 115C of the releasing member 115 from moving constantly along a cam slope of the cam portion 116C of the cam member 116. Consequently, with the configurations of the present exemplary embodiment as well, and with a simple configuration, shock caused by collision between the releasing member 115 and the cam member 116 can be alleviated, and rotational drive of the photosensitive drum 1 can be performed in a stable state. Therefore, it becomes possible to reduce possible occurrences of defects such as streaks on images.

According to the present invention, with a configuration in which the first, the second driven members are driven by one driving source, and a clutch is provided on a driving system of the second driven member, the influence of shock at the time of coupling or releasing the clutch to a drive of the first driven member can be restrained.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims the benefit of Japanese Patent Application No. 2012-153055 filed Jul. 6, 2012, which is hereby incorporated by reference herein in its entirety.

What is claimed is:

1. A clutch mechanism used in a system in which a driving source rotationally drives a first driven member and a second driven member, and configured to couple or release a drive to the second driven member, the clutch mechanism comprising:
a driving member configured to transmit a drive from the driving source to a rotating shaft on an idler side;
a driving side engaging member configured to rotate in synchronization with the driving member, and to be movable in an axial direction;
an idler side engaging member fixed to a rotating shaft on an idler side, and configured to engage with the driving side engaging member;
an urging unit configured to urge the driving side engaging member in a direction in which the driving side engaging member meshes with the idler side engaging member;
a releasing member provided with a cam surface configured to cause the driving side engaging member to move axially, and to perform engagement or release of the driving side engaging member with or from the idler side engaging member; and
a cam member provided with a cam surface configured to engage with the cam surface of the releasing member,
an elastic member provided at least at a portion where collision occurs when the releasing member has moved in an axis direction to approach the cam member, in at least one of the releasing member and the cam member.

2. A clutch mechanism used in a system in which a driving source rotationally drives a first driven member and a second driven member, and configured to couple or release a drive to the second driven member, the clutch mechanism comprising:
a driving member configured to transmit a drive from the driving source to a rotating shaft on an idler side;
a driving side engaging member configured to rotate in synchronization with the driving member, and to be movable in an axial direction;
an idler side engaging member fixed to a rotating shaft on an idler side, and configured to engage with the driving side engaging member;
an urging unit configured to urge the driving side engaging member in a direction to mesh with the idler side engaging member;
a releasing member provided with a cam surface configured to cause the driving side engaging member to move axially, and to perform engagement or release of the driving side engaging member with or from the idler side engaging member; and
a cam member provided with a cam surface configured to engage with the cam surface of the releasing member;
a protruding portion which protrudes in an orthogonal direction to the axis direction and provided at least at a portion where collision occurs when the releasing member has moved in an axis direction to approach the cam member, in at least one of the releasing member and the cam member, and
wherein the protruding portion is deformable in the axis direction.

3. A clutch mechanism used in a system in which a driving source rotationally drives a first driven member and a second driven member, and configured to couple or release a drive to the second driven member, the clutch mechanism comprising:
a driving member configured to transmit a drive from the driving source to a rotating shaft on an idler side;
a driving side engaging member configured to rotate in synchronization with the driving member, and to be movable in an axial direction;
an idler side engaging member fixed to a rotating shaft on an idler side, and configured to engage with the driving side engaging member;
a first urging unit configured to urge the driving side engaging member in an urging direction to mesh with the idler side engaging member;
a releasing member provided with a cam surface, and configured to cause the driving side engaging member to move in the axial direction, and to perform engagement or release of the driving side engaging member with or from the idler side engaging member;

a cam member provided with a cam surface configured to engage with the cam surface of the releasing member; and a second urging unit provided between the releasing member and the cam member, and configured to urge the releasing member in an opposite direction to the urging direction of the first urging unit, and to have an urging force smaller than an urging force of the first urging unit.

4. The clutch mechanism according to claim 1, wherein the first driven member is a photosensitive member, and the second driven member is a developer bearing member.

5. An image forming apparatus equipped with a driving device having the clutch mechanism according to claim 1.

6. An image forming apparatus equipped with a driving device having the clutch mechanism according to claim 2.

7. An image forming apparatus equipped with a driving device having the clutch mechanism according to claim 3.

* * * * *